United States Patent
Yamaoka (10) Patent No.: US 8,378,057 B2
(45) Date of Patent: Feb. 19, 2013

(54) POLYETHER ESTER BLOCK COPOLYMER

(75) Inventor: Katsushi Yamaoka, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/181,010

(22) Filed: Jul. 12, 2011

(65) Prior Publication Data

US 2011/0288264 A1     Nov. 24, 2011

Related U.S. Application Data (62) Division of application No. 11/911,591, filed as application No. PCT/JP2006/307947 on Apr. 14, 2006, now abandoned.

(30) Foreign Application Priority Data

Apr. 15, 2005   (JP) ................. 2005-117730

(51) Int. Cl.
*C08G 63/66*    (2006.01)
*C08G 63/02*    (2006.01)

(52) U.S. Cl. .......... 528/301; 528/272; 528/300

(58) Field of Classification Search ........... 528/272, 528/301, 300
See application file for complete search history.

(56) References Cited

U.S. PATENT DOCUMENTS

| | | | |
|---|---|---|---|
| 3,651,014 A * | 3/1972 | Witsiepe ............... | 528/301 |
| 4,403,007 A | 9/1983 | Coughlin | |
| 4,430,468 A | 2/1984 | Schumacher | |
| 6,331,606 B1 | 12/2001 | Sun | |
| 6,441,125 B2 | 8/2002 | Bonte et al. | |
| 6,562,457 B1 | 5/2003 | Goldfinder et al. | |
| 2002/0016437 A1 | 2/2002 | Bonte et al. | |
| 2005/0272911 A1 | 12/2005 | Okoshi et al. | |
| 2005/0282966 A1 | 12/2005 | Sunkara et al. | |
| 2007/0010633 A1 | 1/2007 | Park | |

FOREIGN PATENT DOCUMENTS

| | | |
|---|---|---|
| JP | 8-511578 | 12/1996 |
| JP | 10-80977 | 3/1998 |
| JP | 2001 2768 | 1/2001 |
| JP | 3164168 | 3/2001 |
| JP | 2001 342331 | 12/2001 |
| JP | 2002-528579 | 9/2002 |
| JP | 2003 147058 | 5/2003 |
| JP | 2004-182974 | 7/2004 |
| JP | 2005 507967 | 3/2005 |
| JP | 2005 507972 | 3/2005 |
| WO | WO 95/00574 A1 | 1/1995 |
| WO | 2004/058888 | 7/2004 |

OTHER PUBLICATIONS

Japanese Office Action issued Nov. 22, 2011, in Patent Application No. 2006-111856 (with English-language translation).

* cited by examiner

*Primary Examiner* — Ling Choi
*Assistant Examiner* — Gennadiy Mesh
(74) *Attorney, Agent, or Firm* — Oblon, Spivak, McClelland, Maier & Neustadt, L.L.P.

(57) ABSTRACT

To provide a polyether ester block copolymer which has surface hardness suitable to be applied to a structural member and excellent in sound deadening quality and tribological property, a polyether ester block copolymer of the present invention comprises (a) aromatic dicarboxylic acid unit, (b) 1,3-propanediol and/or 1,4-butanediol unit and (c) long chain diol unit mainly including polyoxytrimethylene glycol, wherein the durometer hardness (type D), measured according to the principle of the method described in JIS K6253, is 40 or larger and 78 or smaller.

4 Claims, 1 Drawing Sheet

POLYETHER ESTER BLOCK COPOLYMER

TECHNICAL FIELD

The present invention relates to a polyether ester block copolymer, and sound deadening structural member, auto parts, and electric equipment/electronic device parts using the same. More particularly, the present invention relates to a polyether ester block copolymer which has characteristics of both engineering plastic and rubber elastic body, and sound deadening structural member, auto parts, and electric equipment/electronic device parts using the same.

BACKGROUND ART

A polyether ester block copolymer consists of a hard segment and a soft segment. Mainly, polybutyleneterephthalate is used as a hard segment and polyoxyalkylene glycol ester is used as a soft segment. A polyether ester block copolymer can be produced by copolymerizing the hard segment and the soft segment. This copolymer is a substance which has characteristics of both engineering plastic (durability, heat resistance, oil resistance, chemical resistance, ozone resistance, molding processability, etc.) and rubber elastic body (sound deadening quality, impact resistance, repulsion resilience, low-temperature resistance, bending-fatigue etc.) and is widely used, for example, as auto parts, industrial parts, precision machine parts, electric/electronic device parts, fiber, film and articles of daily use. In particular, application as a structural member of auto parts, industrial parts, precision machine parts and electric/electronic device parts has been actively pursued.

Generally, polyoxytetramethylene glycol (hereinafter abbreviated as "PTMG", as appropriate) has been widely used as polyoxyalkylene glycol to be used for a polyether ester block copolymer. However, its elasticity, heat resistance and low-temperature resistance are not always satisfactory. In order to overcome these difficulties, a polyether ester block copolymer using polyoxytetramethylene glycol ester as a soft segment, which was selected from among various combinations of each segment, has been proposed and claimed to be excellent in elastic recovery, a property of returning to original state as an elastic body when, for example, stretched (refer to Patent Document 1).

Further, in order to overcome the above difficulties, a polyether ester block copolymer has been proposed using polybutylene terephthalate as a hard segment and polyoxytrimethylene glycol ester as a soft segment and whose weight ratio of the soft segment is 60 to 90%. The above-mentioned elastic recovery of this copolymer has been disclosed to be the most excellent (refer to Patent Document 2).

[Patent Document 1] Japanese Patent No. 3164168
[Patent Document 2] U.S. Pat. No. 6,562,457

DISCLOSURE OF THE INVENTION

Problem to be Solved by the Invention

According to the investigation of the present inventors, a polyether ester block copolymer disclosed in Patent Document 2 is low in surface hardness and nearly equal in sound deadening quality as a polyether ester block copolymer which uses polyoxytetramethylene glycol ester as a soft segment, and, therefore, its application to a structural member has been difficult.

The present invention has been made to solve these problems. The purpose of the invention is to provide a polyether ester block copolymer which is excellent in surface hardness, sound deadening quality and tribological property.

Means for Solving the Problem

The present inventors made an intensive investigation to solve the above problems and succeeded in solving the problems by adjusting each component of the polyether ester block copolymer, which comprises dicarboxylic acid unit, short chain diol unit and long chain diol unit. The present invention has thus been completed.

Namely, the subject matter of the present invention lies in a polyether ester block copolymer comprising (a) aromatic dicarboxylic acid unit, (b) 1,3-propanediol and/or 1,4-butanediol unit and (c) long chain diol unit mainly including polyoxytrimethylene glycol, wherein the durometer hardness (type D), measured according to the principle of the method described in JIS K6253, is 40 or larger and 78 or smaller. Durometer hardness (type D) serves as one index which numerically represents surface hardness of molded objects of copolymers.

Another subject matter of the present invention lies in a sound deadening structural member using the above-mentioned polyether ester block copolymer, an auto part and an electric equipment/electronic device part, which are comprised by the sound deadening structural member.

Advantageous Effect of the Invention

According to the present invention, it is possible to provide a polyether ester block copolymer which has surface hardness suitable to be applied to a structural member and excellent in sound deadening quality and tribological property.

BRIEF DESCRIPTION OF THE DRAWINGS

FIG. 1 Both (a) and (b) are diagrams showing one example of constitution of an apparatus designed to determine a characteristic of reducing the sound level of collision sound generated when objects collide, and a characteristic of attenuating the collision sound in a short period of time.

EXPLANATION OF LETTERS OR NUMERALS 1,2 Support (block of wood)
3 Steel plate
4 Sample piece
5 Iron ball
6 Electromagnetic releaser
7 Sound level meter

BEST MODES FOR CARRYING OUT THE INVENTION

An embodiment of the present invention will be explained below. It is to be understood that the present invention is not limited to the embodiment and any modifications can be added thereto insofar as they do not depart from the scope of the present invention.

The polyether ester block copolymer of the present invention comprises: (a) aromatic dicarboxylic acid unit, (b) 1,3-propanediol and/or 1,4-butanediol unit and (c) long chain diol unit mainly including polyoxytrimethylene glycol (hereinafter referred to as "PO3G", as appropriate).

[I. Polyether Ester Block Copolymer]

The polyether ester block copolymer comprises a hard segment having properties of a crystal and a soft segment having more molecular mobility as compared with the hard segment. In the present invention, in order to differentiate the above hard segment and soft segment clearly, the unit expressed by the following formula (1) is designated as hard segment and the unit expressed by the following formula (2) is designated as soft segment.

[Chemical Formula 1]

In the above formula (1) and (2),
$R^1$ represents, independently of each other, a chemical structure derived from carbocyclic compound possessing a benzene nucleus and/or non-benzenoid aromatic compound,
$R^2$ represents a trimethylene group and/or tetramethylene group, and
n represents an integer of 1 or larger and 1000 or smaller.

In the above definition, the term "benzene nucleus" indicates a six-membered carbon ring having aromaticity and the term "non-benzenoid aromatic compound" indicates a compound possessing aromaticity without benzene nucleus, such as azulene or aromatic heterocyclic compound having aromaticity.

The hard segment represented by the formula (1) above is a polyester comprising (a) aromatic dicarboxylic acid unit and (b) 1,3-propanediol and/or 1,4-butanediol unit. The soft segment represented by the above formula (2) is a polyether ester comprising (a) aromatic dicarboxylic acid unit and (c) long chain diol unit mainly constituted of polyoxytrimethylene glycol. In some known documents, the soft segment is represented only by its main component, long chain diol unit.

The ratio of the soft segment in the polyether ester block copolymer of the present invention, namely, the ratio of the polyether ester portion comprising (a) aromatic dicarboxylic acid unit and (c) long chain diol unit mainly including polyoxytrimethylene glycol in the entire polyether ester block copolymer is usually 1 weight % or higher, preferably 5 weight % or higher, more preferably 10 weight % or higher, still more preferably 23 weight % or higher, and usually 60 weight % below, preferably 59 weight % or lower, more preferably 57 weight % or lower, still more preferably 54 weight % or lower. When the ratio of the above soft segment is below the lower limit, elastic-body properties of the copolymer due to the soft segment may be insufficient. On the other hand, when the ratio of the above soft segment exceeds the upper limit, surface hardness of the copolymer may be insufficient, making application to a structural member difficult.

Usually, the weight ratio of the monomer used in the production of the copolymer is almost equal to the weight ratio of the monomer component in the copolymer obtained. Therefore, the weight ratio of the soft segment in the copolymer can usually be calculated from the weight ratio of the monomer used in the production.

(1) (a) Aromatic Dicarboxylic Acid Unit

As a material of (a) aromatic dicarboxylic acid unit of the present invention (hereinafter referred to as "(a') aromatic dicarboxylic acid component") can be used a compound usually used as a material of polyester, particularly polyether ester block copolymer. As examples can be cited terephthalic acid, naphthalene-2,6-dicarboxylic acid, naphthalene-2,7-dicarboxylic acid, diphenyl-4,4'-dicarboxylic acid, isophthalic acid, phthalic acid, diphenoxyethane dicarboxylic acid and 5-sulfoisophthalic acid. Of these, preferable are terephthalic acid and 2,6-naphthalene dicarboxylic acid. Particularly preferable is terephthalic acid. These aromatic dicarboxylic acids can be usually used as a single one, but can be used as a mixture of two or more kinds in any combination and in any ratio. When alkyl ester of aromatic dicarboxylic acid is used, dimethyl ester or diethyl ester of the above aromatic dicarboxylic acids, for example, can be used. Preferable are dimethyl terephthalate and 2,6-dimethyl naphthalene dicarboxylate.

(2) (b) 1,3-Propanediol and/or 1,4-butanediol Unit

As a material of (b) 1,3-propanediol and/or 1,4-butanediol unit of the present invention (hereinafter referred to as "(b') 1,3-propanediol and/or 1,4-butanediol component") can be usually used 1,3-propanediol or 1,4-butanediol as a single entity. The two may be mixed in an arbitrary ratio. Preferable is use of 1,4-butanediol as a single entity.

(3) (c) Long Chain Diol Unit

As a material of (c) long chain diol unit (hereinafter referred to as "(c') long chain diol component"), which is a part of the constitution unit of the soft segment of the polyether ester block copolymer of the present invention, can be used polyoxytrimethylene glycol represented by the formula (3) below.

[Chemical Formula 2]

$$H—(OCH_2CH_2CH_2)_n—OH \tag{3}$$

(In the above formula (3), n represents an integer of 1 or larger and 1000 or smaller.)

The number average molecular weight (Mn) of polyoxytrimethylene glycol used in the present invention is usually 400 or larger, preferably 600 or larger, more preferably 800 or larger, and usually 6000 or smaller, preferably 4000 or smaller, more preferably 3000 or smaller, the most preferably 2000 or smaller. When the number average molecular weight is too small, melting point depression may be marked, having a bad influence upon heat resistance. On the other hand, when the number average molecular weight is too large, the viscosity of polyoxytrimethylene glycol will be too large, and phase separation in the polyether ester block copolymer comprised of it may be marked, leading to deterioration of physical properties of the molded object based on the copolymer.

"The number average molecular weight (Mn)" referred to here can be determined as follows. Terminal hydroxyl groups in polyoxyalkylene glycol such as polyoxytrimethylene glycol are esterified with phthalic anhydride, the excess phthalic anhydride is hydrolyzed to phthalic acid and back titrated with alkali such as sodium hydroxide solution (terminal group titration method). Hydroxyl group equivalent obtained is used for the calculation.

Polyoxytrimethylene glycol described above can be synthesized by polycondensation of 1,3-propanediol or ring-opening polymerization of trimethylene oxide. The latter method depends on expensive trimethylene oxide and, therefore, the former method based on polycondensation of 1,3-propanediol is preferable. Reaction product of polycondensation of 1,3-propanediol can be synthesized by known methods, for example, dehydration/condensation of 1,3-propanediol in the presence of a catalyst composed of acid and base, as described in Japanese Patent Laid-Open Publication (Kokai) No. 2004-182974.

(c') Long chain diol component of the present invention mainly includes the above-mentioned polyoxytrimethylene glycol. However, part of it may be replaced by other polyoxyalkylene glycol, as needed. Examples of other polyoxyalkylene glycol used for such replacement include: polyoxyethylene glycol, polyoxy(1,2-propylene)glycol, polyoxytetramethylene glycol, block or random copolymer of ethylene oxide and propylene oxide, block or random copolymer of ethylene oxide and THF (tetrahydrofuran), polyoxy(2-methyl-1,3-propylene) glycol and polyoxypropylene diimide diacid. However, as the present invention is characterized in that the above polyoxytrimethylene glycol is mainly included in (c') long chain diol component, the content ratio of the polyoxytrimethylene glycol in the total weight of (c') long chain diol component is usually 60 weight % or higher, preferably 70 weight % or higher, more preferably 80 weight % or higher, and usually 100 weight % or lower. When the content ratio of polyoxytrimethylene glycol is below the above range, the advantageous effect of the present invention such as sound deadening quality may not be exhibited.

[II. Production Method for Polyether Ester Block Copolymer]

The method of production of the polyether ester block copolymer of the present invention will be explained in detail below.

There is no special limitation on the method of production of the polyether ester block copolymer of the present invention and any hitherto known production method of copolymerized polyester can be used. Examples include: ester exchange reaction of (a') aromatic dicarboxylic acid component, excess (b') 1,3-propanediol and/or 1,4-butanediol component and (c') long chain diol component in the presence of a catalyst, followed by polycondensation of the reaction product obtained under reduced pressure; esterification reaction of (a') aromatic dicarboxylic acid component, (b') 1,3-propanediol and/or 1,4-butanediol component and (c') long chain diol component in the presence of a catalyst, followed by polycondensation of the reaction product obtained under reduced pressure; preparation of short chain polyester first (for example, polybutylene terephthalate) and addition of other aromatic dicarboxylic acid component and (c') long chain diol component, followed by polycondensation; ester exchange reaction with other copolymerized polyester using twin screw extruder or the like. Any of these methods can be adopted.

As highly preferable example of a catalyst common to ester exchange reaction/esterification reaction and copolymerization reaction can be cited titanium series of catalyst such as: tetraalkyl titanate represented by tetra(isopropoxy) titanate and tetra(n-butoxy) titanate, reaction product of these tetraalkyl titanates and alkylene glycol, partial hydrolyzate of tetraalkyl titanate, metal salt of titanium hexaalkoxide, carboxylic acid salt of titanium, and titanyl compound. As other preferable examples can be cited monoalkyl tin compound such as mono-n-butylmonohydroxy tin oxide, mono-n-butyl tin triacetate, mono-n-butyl tin monooctylate and mono-n-butyl tin monoacetate, and dialkyl (or diaryl) tin compound such as di-n-butyl tin oxide, di-n-butyl tin diacetate, diphenyl tin oxide, diphenyl tin diacetate and di-n-butyl tin dioctylate. Besides, metal compounds of such metals as Mg, Pb, Zr, Zn, Sb, Ge and P are also useful. These catalysts can be used either as a single one or as a mixture of two or more kinds in any combination and in any ratio. When used as a single entity, tetraalkyl titanate is preferable. When used in combination, combined use of tetraalkyl titanate and magnesium acetate is preferable.

The lower limit of the amount of the catalyst used, relative to the amount of the polyether ester block copolymer formed, is usually 0.001 weight % or more, preferably 0.003 weight % or more. The upper limit is usually 0.5 weight % or less, preferably 0.2 weight % or less. When the amount is below the above lower limit, the reaction does not proceed smoothly and productivity may be low. When the upper limit is exceeded, the polyether ester block copolymer formed may become colored and the appearance of the surface of the molded object of the copolymer may be damaged and unsatisfactory.

These catalysts are added to the reaction system at the beginning of the ester exchange or esterification reaction. Thereafter, the catalysts may be added again at the time of copolymerization reaction but this can be omitted.

Furthermore, polyfunctional component such as polycarboxylic acid, polyfunctional hydroxyl compound or oxyacid may be copolymerized as part of dicarboxylic acid or diol. The polyfunctional component works efficiently to increase viscosity and its content in the copolymer is preferably 0 mol % or more and 3 mol % or less. When the content is too high, the polyether ester block copolymer formed may become gelation and this is not desirable. As examples of possible polyfunctional component can be cited trimellitic acid, trimesic acid, pyromellitic acid, benzophenone tetracarboxylic acid, butane tetracarboxylic acid, glycerin, trimethylolpropane, pentaerythritol and their ester and their acid anhydride. They can be used either as a single one or as a mixture of two or more kinds in any combination and in any ratio.

Furthermore, an antioxidant may be added any time during preparation or after preparation of the polyether ester block copolymer. Especially when polyoxytrimethylene glycol is exposed to high temperature, for example, when polymerization reaction is to start, it is preferable to add an antioxidant to prevent oxidation of polyoxyalkylene glycol insofar as copolymerization reaction is not inhibited and function of the catalyst is not impaired. Examples of antioxidants include: phosphorus-containing compound such as aliphatic, aromatic or alkyl group-substituted aromatic ester of phosphoric acid or phosphorous acid, hypophosphorous acid derivative, phenyl phosphonic acid, phenyl phosphinic acid, diphenylphosphonic acid, polyphosphnate, dialkylpentaerythritol diphosphite, dialkyl bisphenol A diphosphite; phenol derivative such as hindered phenol; sulfur-containing compound such as thioether compound, dithioic acid salt, mercaptobenzimidazole compound, thiocarbanilide compound, thiodipropionic acid ester; Sn-containing compound such as tin malate and dibutyl tin monoxide. They can be used either as a single one or as a mixture of two or more kinds in any combination and in any ratio.

The amount of the antioxidant used, per 100 weight portion of the polyether ester block copolymer, is usually 0.001 weight portion or more, preferably 0.01 weight portion or more, and usually 3 weight portion or, less, preferably 2 weight portion or less. When the amount of the antioxidant used is below the above lower limit, the effect of the antioxidant may not be sufficient. When the upper limit is exceeded, the polyether ester block copolymer formed may become colored and the appearance of the surface of the molded object of the copolymer may be damaged and unsatisfactory.

There is no special limitation on the reaction conditions of polyether ester block copolymerization and any known conditions may be used. For example, reaction conditions for the methods, such as ester exchange reaction is performed in the presence of a catalyst, followed by polycondensation of the reaction product under reduced pressure, or esterification is performed in the presence of a catalyst, followed by polycondensation of the reaction product under reduced pressure, are as follows.

The first step of ester exchange reaction or esterification reaction is usually performed at a reaction temperature of 120° C. or higher, preferably 140° C. or higher, and usually 250° C. or lower, preferably 240° C. or lower. The reaction time is usually 1 hour or longer, and 5 hours or shorter. When the reaction temperature is below the above lower limit, the reaction may not proceed smoothly, leading to low productivity. When the upper limit of the reaction temperature is exceeded, the polyether ester block copolymer formed may become colored. When the reaction time is too short, ester exchange reaction or esterification reaction may not proceed sufficiently, and ensuing polycondensation reaction may not proceed. When the reaction time is too long, ester exchange reaction or esterification reaction proceeds sufficiently and, therefore, productivity may be low.

The second step polycondensation reaction is usually performed under a reduced pressure of 10 torr or lower and at a reaction temperature of 200° C. or higher, preferably 220° C. or higher, and usually 280° C. or lower, preferably 270° C. or lower. The reaction time is usually 1 hour or longer, and 6 hours or shorter. When the reaction temperature is below the above lower limit, the reaction may not proceed smoothly, leading to low productivity. When the upper limit of the reaction temperature is exceeded, the polyether ester block copolymer formed may become colored. When the reaction time is too short, polycondensation reaction may not proceed sufficiently, and the polymerization degree of the copolymer may be too low. When the reaction time is too long, the polymer formed may become colored or depolymerization reaction may occur, leading to low the polymerization degree.

Usually, the polyether ester block copolymer of the present invention, obtained in the above melt polycondensation process, is maintained at a temperature above its melting point, gradually poured out of the reaction vessel like a reaction can and molded by a process such as pelletizing. The pellet obtained may be further subjected to solid-state polymerization.

At the time of production of the polyether ester block copolymer of the present invention, in addition to the above-mentioned (a') aromatic dicarboxylic acid component, (b') 1,3-propanediol and/or 1,4-butanediol component and (c') long-chain diol component mainly including polyoxytrimethylene glycol, arbitrary component may be mixed into the final product polyether ester block copolymer as needed, insofar as the object and advantage of the present invention are not significantly impaired. Concrete examples include previously known additives such as: filler agent or reinforcing agent such as silica, talc, mica, titanium dioxide, alumina, calcium carbonate, calcium silicate, clay, kaolin, diatom earth, asbestos, barium sulfate, aluminum sulfate, calcium sulfate, basic magnesium carbonate, molybdenum disulfide, graphite, glass fiber and carbon fiber; mold-releasing agent or lubricant such as zinc stearate and stearic acid bisamide; dye and pigment used for coloring such as carbon black, ultramarine blue pigment, titanium oxide, zinc oxide, colcothar, iron blue pigment, azo pigment, nitro pigment, lake pigment and phthalocyanine pigment; flame-resisting agent such as octabromodiphenyl and tetrabromobisphenol polycarbonate; photo-stabilizing agent such as hindered amine compound; UV absorbing agent such as benzotriazole compound; foaming agent such as inorganic salt like sodium carbonate and organic salt such as sodium citrate; bridging agent such as epoxy compound and isocyanate compound; viscosity adjusting agent such as mineral oil, vegetable oil, silicone oil and silicone resin; tribological property ameliorating agent such as substituted amide compound and aliphatic amide compound; and various electrical conducting material to impart electrical conductivity. They can be used either as a single one or as a mixture of two or more kinds in any combination and in any ratio.

[III. Physical Properties of Polyether Ester Block Copolymer]

The polyether ester block copolymer of the present invention has the following physical properties.

(1) Surface Hardness:

Durometer hardness (type D), measured according to the principle of the method described in JIS K6253, serves as one index which numerically represents surface hardness of molded objects. It is generally known that the value obtained by this method fluctuates depending on the method of molding test piece, reflecting different molecular orientation. In this invention, the value obtained for a test piece of 2 mm thickness, prepared from heat press sheet, was adopted as standard and described in detail.

The polyether ester block copolymer of the present invention is characterized in that its durometer hardness (type D), measured according to JIS K6253, is usually 40 or larger, preferably 42 or larger, more preferably 44 or larger, and usually 78 or smaller, preferably 76 or smaller, more preferably or smaller, most preferably 65 or smaller. When the durometer hardness is below the above lower limit, surface hardness of the copolymer is insufficient, making its application to a structural member difficult and superiority in sound deadening quality, in comparison with a polyether ester block copolymer using polyoxytetramethylene glycol ester as a soft segment, is less marked. On the other hand, when the durometer hardness exceeds the upper limit, surface hardness of the copolymer may be too high and elastic-body properties may be insufficient.

(2) Viscosity:

Inherent viscosity ($\eta_{inh}$) of the solution of the polyether ester block copolymer of the present invention is usually 0.30 dl/g or larger, preferably 0.40 dl/g or larger, and usually 2.50 dl/g or smaller, preferably 2.40 dl/g or smaller, more preferably 2.30 dl/g or smaller. When the inherent viscosity is below the lower limit, physical properties of molded objects of the copolymer may be far from satisfactory as a structural member. On the other hand, when the above inherent viscosity exceeds the upper limit, fluidity of the copolymer may be low and molding it into a structural member may be difficult.

In order to measure inherent viscosity ($\eta_{inh}$) of the solution of the polyether ester block copolymer, the copolymer is dissolved in a solvent which is a 1:1 mixture (weight basis) of phenol and 1,1,2,2-tetrachloroethane, and the relative viscosity ($\eta_{rel}$) of the solution is determined at 30° C. The natural logarithm of the relative viscosity ($\eta_{rel}$) is divided by the concentration of the solution (C) to obtain inherent viscosity ($\eta_{inh}$) represented by the following formula 1.

[mathematical formula 1]

$$\eta_{inh} = \ln \eta_{rel}/C \qquad (\mathrm{I})$$

In the above formula (I), $\eta_{rel}$ represents relative viscosity and C represents concentration of the solution (g/dl).

(3) Terminal Carboxyl Group Equivalent:

The terminal carboxyl group equivalent (AV) of the polyether ester block copolymer of the present invention is usually 70 eq/ton or less, preferably 65 eq/ton or less, more preferably 60 eq/ton or less. When the AV exceeds the upper limit, long term stability, such as hydrolysis resistance, may deteriorate considerably.

(4) Density:

The density of the polyether ester block copolymer of the present invention is usually 1.155 g/cm³ or larger, preferably 1.160 g/cm3 or larger, more preferably 1.165 g/cm³ or larger, still more preferably 1.170 g/cm³ or larger, most preferably 1.175 g/cm³ or larger, and usually 1.290 g/cm³ or smaller, preferably 1.280 g/cm³ or smaller, more preferably 1.270 g/cm³ or smaller, most preferably 1.260 g/cm³ or smaller. When the density is below the above lower limit, surface hardness of the copolymer may be insufficient, making application to a structural member difficult. On the other hand, when the density exceeds the upper limit, surface hardness of the copolymer may be too high and elastic-body properties may be insufficient.

(5) Sound Deadening Quality:

In the present invention, sound deadening quality is classified into the following two categories (i) and (ii).

Figures 1A, 1B:
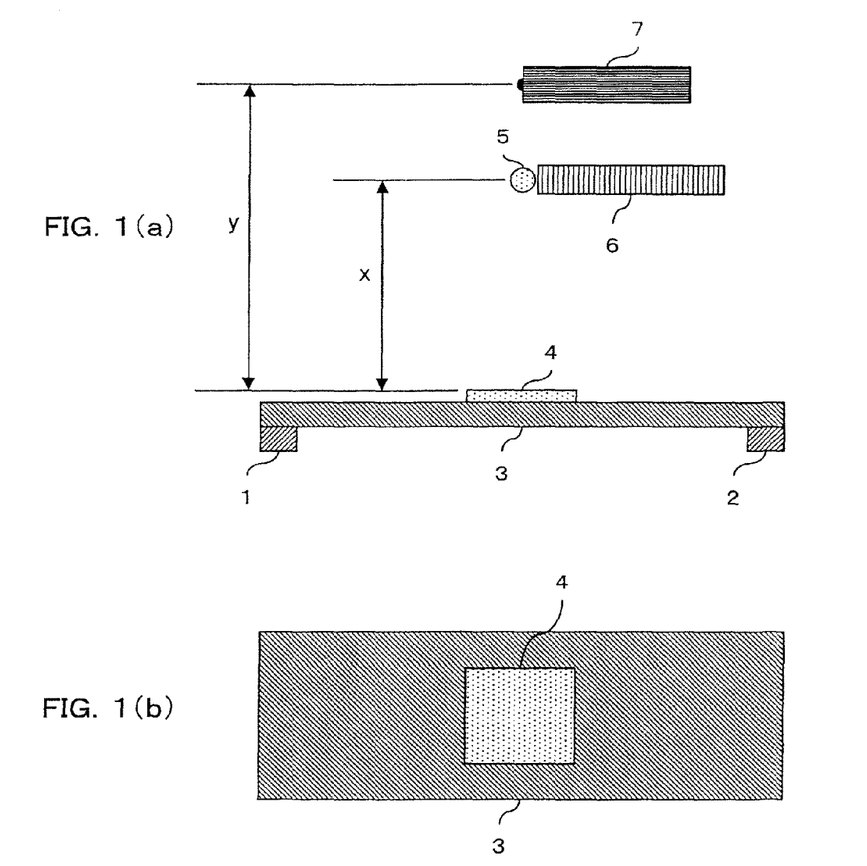

(i) reduction of the sound level of collision sound generated when objects collide (ii) attenuation of collision sound, generated when objects collide, within a short period of time These two categories of characteristics (i), (ii) can be evaluated at the same time using an apparatus, for example, with a constitution shown in FIGS. 1(*a*) and 1(*b*). FIGS. 1(*a*) and 1(*b*) are diagrams showing one example of constitution of an apparatus designed to determine a characteristic of reducing the sound level of collision sound generated when objects collide, and a characteristic of attenuating the collision sound in a short period of time. More concretely, FIG. 1(*a*) is a side view of the essential part of the corresponding apparatus. Letters 1 and 2 show supports (blocks). Letter 3 shows a steel plate. Letter 4 shows a heat press sheet of the polyether ester block copolymer (hereinafter referred to as "sample piece" as appropriate), which is the measuring object. Letter 5 shows an iron ball. Letter shows an electromagnetic releaser, and letter 7 shows a sound level meter. FIG. 1(*b*) is a top view of steel plate 3 and sample piece 4. The distance from the top surface of steel plate 3 to the detachment point of iron ball 5 on electromagnetic releaser 6 (the distance represented by letter "x" in FIG. 1(*a*)) is 660 mm. The distance from the top surface of steel plate 3 to the measurement point of sound level meter 7 (the distance represented by letter "y" in FIG. 1(*a*)) is 1000 mm.

Steel plate 3 (SUS304, 30 cm×10 cm×1 cm thickness) was placed on a floor, with blocks 1 and 2 (5 mm in height) as a supporting base. Sample piece 4 of the heat press sheet (75 mm×75 mm×2 mm thickness) of the polyether ester block copolymer was placed at the center of the steel plate 3, and an iron ball 5 (5.4 g weight) was fell freely on it from the height of 660 mm to sample piece 4 using an electromagnetic releaser 6. The sound generated at the collision was measured with a sound level meter 7. The maximum sound level (L) measured was determined and, at the same time, attenuation of the sound level during 0.2 seconds from generation of the maximum sound level was obtained as time-dependent change curve of sound level. The time-dependent change curve obtained was approximated to a straight line and the absolute value of the slope (D) of the straight line was determined. The maximum sound level (L) and the absolute value (D) of the slope of the attenuation line (approximate line) of the sound level were compared with the corresponding maximum sound level ($L_0$) and absolute value ($D_0$) of the slope of the attenuation line of the sound level, which were obtained when the iron ball 5 was fell freely directly on the steel plate 3 without setting sample piece 4. The corresponding absolute value ($D_0$) of the slope was determined by the same procedure as above.

The value ($L_0$–L), which represents decrease of the maximum sound level compared when the sample piece 4 is not placed on steel plate 3 to when it is placed, is defined as ΔL. The characteristic (i) described above (reduction of the sound level of collision sound generated when objects collide) can be evaluated as a value of ΔL and the larger value of ΔL means better sound deadening quality. The value of ΔL is preferably 0.5 dB or larger, more preferably 1 dB or larger, most preferably 2 dB or larger. When the ΔL is below the above lower limit, the reduction in collision sound level is too small and, therefore, the advantageous effect of sound deadening quality may be insufficient.

The absolute value (D–$D_0$), which represents increase of the absolute value of the slope of the attenuation line of the sound level compared when the sample piece 4 is not placed on the steel plate 3 to when it is placed, is defined as ΔD. The characteristic (ii) described above (attenuation of collision sound, generated when objects collide, within a short period of time) can be evaluated as a value of ΔD and the larger value of ΔD means better sound deadening quality. The value of ΔD is preferably 1 dB/sec or larger, more preferably 2 dB/sec or larger, most preferably 3 dB/sec or larger. When the ΔD is below the above lower limit, the attenuation in collision sound level is too small and, therefore, the advantageous effect of sound deadening quality may be insufficient.

(6) Tribological Property:

Generally, tribological property of a structural member is considered to be good when frictional coefficient of the surface of the member is low. The value of static frictional coefficient, when structural members using the polyether ester block copolymer of the present invention scrape against each other, is preferably 0.6 or lower, more preferably 0.5 or lower. And the value of dynamic frictional coefficient is preferably 0.5 or lower, more preferably 0.4 or lower. When the value of these coefficients exceeds the above range, abnormal sound may be generated due to stick-slip phenomenon occurring when structural members scrape against each other, which is not desirable.

[IV. Application of Polyether Ester Block Copolymer]

The polyether ester block copolymer of the present invention possesses surface hardness suitable for application as a structural member and is characterized by its excellent sound deadening quality and tribological property. Based on these advantages, the polyether ester block copolymer of the present invention can be used such as materials for various sound deadening structural members to attenuate noise or abnormal sound originating from such sources as engine, motor or cooling fan.

More concretely, the polyether ester block copolymer of the present invention can be used preferably as, for example: auto parts such as constant velocity joint boot, suspension boot, rack and pinion boot, cover for steering rod, cable inner liner, cable outer jacket, AT slide cover, seat belt parts, car emblem, door latch striker, rebound stopper, ratchet for safety belt and leaf spring bush; industrial part such as various hoses including hydraulic hose and inflatable hose, various sealings and packings, flexible coupling, conveyer belt, timing belt and compression spring; precision machine part such as gear; electric/electronic device parts such as cellular phone housing, damping material, vibration insulator, keyboard pad, conductive pad, OA roller, curl code for telephone, cover for optical fiber and gear; articles of daily use such as hair brush, hot curler, ski boot sole and shoe insole; fiber product such as fiber for clothing, nonwoven fabric and various kinds of filters; and film product such as biaxially-stretched film and conductive film.

Of these, the polyether ester block copolymer of the present invention is particularly suitable for auto parts such as constant velocity joint boot, suspension boot and rack and pinion boot, for which good tribological property as well as sound deadening quality is needed, and for electric/electronic parts of such devices as motor and cooling fan, for which noise control is essential.

Example

The present invention will be explained more concretely below by referring to Examples. It is to be understood that the present invention is by no means limited by these Examples insofar as they do not depart from the intent of the invention.
[Method of Evaluation of Physical Properties]
Method of evaluation of various physical properties of the polyether ester block copolymer to be obtained in Examples and Comparative Examples described later will be explained first.
<Inherent Viscosity ($\eta_{inh}$)>
The pellet of the polyether ester block copolymer 0.2 g was dissolved with stirring in 40 ml of a solvent, which is a 1:1 mixture of phenol and 1,1,2,2-tetrachloroethane, during a period of 15 minutes while the temperature was maintained at 110° C. The relative viscosity of this solution ($\eta_{rel}$) at 30° C. was measured with a Ubbelohde viscosimeter (Sentec full automatic viscosimeter DT610). According to the formula (I) as below, the natural logarithm of the relative viscosity $f_{rel}$) is divided by the concentration of the solution (C) to obtain inherent viscosity ($\eta_{inh}$).

[mathematical formula 2]

$$\eta_{inh} = \ln \eta_{rel}/C \qquad (I)$$

In the above formula (I), $\eta_{rel}$ represents relative viscosity and C represents concentration of the solution (g/dl).
<Terminal Carboxyl Group Equivalent>
The pellet of the polyether ester block copolymer 0.5 g was transferred to a test tube, 25 ml of benzyl alcohol was added, and dissolution was effected during 15 minutes at 150° C. under stirring. The solution obtained was titrated with 0.01 N NaOH benzyl alcohol solution by means of a complex pH electrode using an automatic titration apparatus (TOA DKK AUT-501). The solution of 0.01 N NaOH benzyl alcohol solution was prepared, standardized and factor was determined by the method described in JIS K8006. From the flexion point of the titration curve, titration volume was obtained and AV was calculated according to the formula (II) as below.

[mathematical formula 3]

$$AV = \{(A-B) \times 0.01 N \times F\}/W \qquad (II)$$

In the above formula (II), AV represents the terminal carboxyl group equivalent (eq/ton), A represents titration volume (ml) measured, B indicates blank titration volume (ml) and F is a titer of 0.01 N NaOH benzyl alcohol solution. W is the sample weight (g) of the polyether ester block copolymer.
<Density>
Heat press sheet of 2 mm thickness of the polyether ester block copolymer was prepared using a heat press molding machine and a cooling equipment with circulating cooling water to which pressure can be applied under various molding conditions described below, and the density was measured according to the principle of the method described in JIS K7112 (method A).

Heat press and cooling was applied to the pellet of the polyether ester block copolymer to prepare heat press sheet of 2 mm thickness. The conditions of the heat press process were as follows. A heat press molding machine was used. The preset temperature of the heat press molding machine was 240° C. in the copolymer samples of Examples 1, 2 and 6 and Comparative Examples 1 to 4 and 8, 250° C. in the copolymer samples of Examples 3 and 4 and Comparative Examples 5 and 6, and 260° C. in the copolymer samples of Example 5 and Comparative Examples 7 and 9. The preheating time was 7 minutes. The heat press pressure was 4.4 MPa, and heat press time was 2 minutes. The conditions of the cooling process were as follows. A cooling equipment with circulating cooling water was used. The cooling pressure of it was 14.7 MPa, and cooling time was 3 minutes.
<Tensile Strength at Break>
Tensile strength at break was measured according to the principle of the method described in JIS K6251 (dumbbell No. 3), using as a sample a heat press sheet of the polyether ester block copolymer, molded the same as the methods described in the above <Density>.
<Tensile Elongation at Break>
Tensile elongation at break was measured according to the principle of the method described in JIS K6251 (dumbbell No. 3), using as a sample a heat press sheet of the polyether ester block copolymer, molded the same as the methods described in the above <Density>.
<Durometer Hardness>
Durometer hardness (D type) was measured according to the principle of the method described in JIS K6253, using as a sample a heat press sheet of the polyether ester block copolymer, molded the same as the methods described in the above <Density>.
<Evaluation of Sound Deadening Quality>
The apparatus shown in the FIGS. 1(a) and 1(b) was used in order to evaluate the sound deadening quality. The characteristic of reducing the sound level of collision sound when objects collide and characteristic of attenuating the collision sound in a short period of time were evaluated by the following procedure.

Namely, steel plate 3 (SUS304, 30 cm×10 cm×1 cm thickness) was placed on a floor, with blocks 1 and 2 (5 mm in height) as a supporting base. Sample piece 4 of the heat press sheet (75 mm×75 mm×2 mm thickness) of the polyether ester block copolymer, molded the same as the methods described in the above <Density>, was placed at the center of the steel plate 3, and an iron ball 5 (5.4 g weight) was fell freely on it from the height of 660 mm to sample piece 4 using an electromagnetic releaser 6. The maximum sound level (L) generated at the collision and the time-dependent change of the sound level were measured with a precision sound level meter 7 (Rion, NL-14). The falling of iron ban 5 was aimed at the center of sample piece 4. In order to equalize the location and velocity of falling of iron ball 5, the apparatus was set in a manner that iron ball 5 had been attached to electromagnetic releaser 6 before fell and was fell at the moment of cutoff of electromagnetic force which had been applied on electromagnetic releaser 6. In addition, in order to correspond various instantaneous phenomena, the sound level was analyzed using the time constant of 0.8 ms. The attenuation of the sound level during 0.2 seconds from the generation of the maximum sound level was obtained as time-dependent change curve of sound level. The time-dependent change curve obtained was approximated to a straight line and then the absolute value (D) of the slope of the straight line obtained was determined.

The maximum sound level ($L_0$) and absolute value ($D_0$) of the slope of the attenuation straight line (approximate line) of the sound level, which were obtained when the iron ball 5 was fell directly on the steel plate 3 without setting sample piece 4 of the heat press sheet, were determined by the same procedure as above. The maximum sound level ($L_0$), corrected for A property, was 97.6 dB(A). The above-mentioned absolute values ($D_0$) of the slope of the sound level attenuation straight line were 126.6 dB/sec in Examples 1 to 3 and Comparative Examples 1 to 5, and 146.3 dB/sec in Examples 4 to 6 and Comparative Examples 6 to 9. In this context, correction for the property was carried out by using the correcting function which the sound level meter possesses. This function is made to enable measurement of a sound having a volume around which human can hear. "A property" is a property of correction based on the time of 40 phone sound level.

Next, the value ($L_0$–L), which represents decrease of the maximum sound level compared when the sample piece 4 is not placed on steel plate 3 to when it is placed, is defined as ΔL. Then the value (D–$D_0$), which represents increase of the absolute value of the slope of the attenuation straight line of the sound level compared when the sample piece 4 is not placed on the steel plate 3 to when it is placed, is defined as ΔD. The sound deadening quality was evaluated as values of ΔL and ΔD. Each measurement was carried out three times, and the average value of them was used as measurement value.

<Evaluation of Tribological Property>

In order to evaluate tribological property of the polyether ester block copolymer, static and dynamic frictional coefficients were determined using HEIDON TRIBOGEAR type=14DR (Shinto Kagaku). Two heat press sheets, molded in the same manner as described in the above <Density>, were layered, and the static and dynamic frictional coefficients were measured while the upper sheet was moved at a rate of 100 mm/min under a weight load of 50 g.

Synthetic Example 1

As (c') long chain diol component of the polyether ester block copolymer, polyoxytrimethylene glycol (Mn=1163) was synthesized according to the following procedure. In the following description, this polyoxytrimethylene glycol may sometimes be indicated by a mark "A".

Namely, 50 g of 1,3-propanediol, purified by distillation, was transferred to a 100 ml 4-necked flask, fitted with a distillation tube, nitrogen-introducing tube, thermometer and stirrer, while nitrogen gas was passed at a rate of 100 Nml/minute. To this was added 0.0348 g of sodium carbonate and, while stirring, 0.678 g of concentrated sulfuric acid (95%) was added slowly. The flask was immersed in an oil bath and heated at 162° C. The reaction was allowed to proceed for 11 hours while the temperature was maintained at 162±2° C. The flask was then taken out of the oil bath and allowed to be cooled to room temperature. The water produced during the reaction was distilled off with a nitrogen stream. The reaction mixture, cooled to room temperature, was transferred to a 300 ml round bottomed flask with 50 g of tetrahydrofuran and, after 50 g of desalted water was added, refluxed gently for one hour to hydrolyze the sulfuric acid ester. The mixture was cooled to room temperature and the lower layer (water layer) separated was removed. The upper layer (oil layer) was mixed with 0.5 g calcium hydroxide and stirred for one hour at room temperature. Toluene 50 g was then added and tetrahydrofuran, water and toluene were distilled off at 60° C. under reduced pressure. The oil layer obtained was dissolved in 100 g of toluene and filtered through 0.45 μm filter to remove insoluble material. The filtrate was dried in a vacuum for 6 hours after heated at 60° C.

Example 1

To a reaction vessel fitted with a stirrer, distillation tube and decompressor were added 68.7 g of dimethyl terephthalate (Tokyo Kasei), 39.8 g of 1,4-butanediol (Tokyo Kasei) and 78.0 g of polyoxytrimethylene glycol (A) prepared in Synthetic Example 1 as above. After replaced with nitrogen, the mixture was heated and molten during the period of 30 minutes at 150° C. under nitrogen atmosphere. Tetrabutyltitanate (Kishida Chemical) was dissolved in 1-butanol at a concentration of 6 weight % and 4.4 mL of this solution (corresponding to 0.02 weight % of polyether ester block copolymer to be produced in terms of Ti atom equivalent) was added to the reaction mixture. The mixture was maintained at 150° C. for 60 minutes while stirred at 150 rpm and then the temperature was raised to 230° C. during the period of 2 hours and held at this temperature for 15 minutes for ester exchange reaction. To the molten mixture obtained was added 5.4 g of slurry, prepared by dispersing IRGANOX 1330 (Ciba Specialty Chemicals) in 1,4-butanediol at a concentration of 5 weight %, and 1.1 mL of the above mentioned tetrabutyltitanate (corresponding to 0.005 weight % of catalyst to polyether ester block copolymer to be produced in terms of Ti atom equivalent) and the mixture was heated during the period of 45 minutes until the temperature reached 245° C. while the pressure was reduced to 1 torr during the period of 85 minutes. The stirring was gradually reduced under that reduced pressure condition and polycondensation reaction was continued until a copolymer with desired inherent viscosity was obtained. The stirring was then stopped, the pressure in the reaction vessel was restored to normal under nitrogen atmosphere and polycondensation reaction was stopped. The strand of polyether ester block copolymer was made into a pellet using a pelletizer and physical properties of the pellet obtained were determined according to the methods described in [Method of Evaluation of physical properties]. The results are presented in Table 1 described later. In this polymerization reaction, 1,4-butanediol was added in excess to accelerate the ester exchange reaction and the ratio of the number of hydroxyl group and that of carboxylic acid group (number of hydroxyl group/number of carboxylic acid group) in the reaction vessel before initiation of the ester exchange reaction is 1.6, calculated from the material used for the reaction. Based on this value, the content ratio of soft segment in the polyether ester block copolymer formed, namely the content ratio of polyether ester portion consisting of (a) aromatic dicarboxylic acid unit and (c) long chain diol unit in the whole polyether ester block copolymer is 57.9 weight %, as calculated from the weight of the material used.

Example 2

Ester exchange reaction and polycondensation reaction were performed in the same manner as described in Example 1, except that the amount of each component used as the material was 89.5 g of dimethyl terephthalate, 57.2 g of 1,4-butanediol and 52.5 g of polyoxytrimethylene glycol (A). The kind and ratio of additives were also the same as in Example 1. The ratio of soft segment in the polyether ester block copolymer produced with this amount of each component is 38.9 weight %, as calculated from the weight of each component used as the material. The polyether ester block copolymer obtained was made into a pellet in the same manner and the evaluations of various physical properties mentioned before were determined. The results are presented in Table 1 described later.

Example 3

Ester exchange reaction and polycondensation reaction were performed in the same manner as described in Example 1, except that the amount of each component used as the material was 107.8 g of dimethyl terephthalate, 72.6 g of 1,4-butanediol and 30.0 g of polyoxytrimethylene glycol (A). The kind and ratio of additives were also the same as in Example 1. The ratio of soft segment in the polyether ester block copolymer produced with this amount of each component is 22.2 weight %, as calculated from the weight of each component used as the material. The polyether ester block copolymer obtained was made into a pellet in the same manner and the evaluations of various physical properties mentioned before were determined. The results are presented in Table 1 described later.

Example 4

In Example 4, and Example 5 described later, polyoxytrimethylene glycol synthesized according to the method described in Synthetic Example 1 (Mn=1962) was used. In the following description, this polyoxytrimethylene glycol may sometimes be indicated by a mark "C".

Ester exchange reaction and polycondensation reaction were performed in the same manner as described in Example 1, except that the amount of each component used as the material was 66.6 g of dimethyl terephthalate, 40.7 g of 1,4-butanediol and 78.0 g of polyoxytrimethylene glycol (C). The kind and ratio of additives were also the same as in Example 1. The ratio of soft segment in the polyether ester block copolymer produced with this amount of each component is 55.5 weight %, as calculated from the weight of each component used as the material. The polyether ester block copolymer obtained was made into a pellet in the same manner and the evaluations of various physical properties mentioned before were determined. The results are presented in Table 1 described later.

Example 5

Ester exchange reaction and polycondensation reaction were performed in the same manner as described in Example 1, except that the amount of each component used as the material was 88.1 g of dimethyl terephthalate, 57.9 g of 1,4-butanediol and 52.5 g of polyoxytrimethylene glycol (C). The kind and ratio of additives were also the same as in Example 1. The ratio of soft segment in the polyether ester block copolymer produced with this amount of each component is 37.3 weight %, as calculated from the weight of each component used as the material. The polyether ester block copolymer obtained was made into a pellet in the same manner and the evaluations of various physical properties mentioned before were determined. The results are presented in Table 1 described later.

Example 6

Ester exchange reaction and polycondensation reaction were performed in the same manner as described in Example 1, except that the amount of each component used as the material was 72.5 g of dimethyl terephthalate, 35.2 g of 1,3-propanediol and 78.0 g of polyoxytrimethylene glycol (A). The kind and ratio of additives were also the same as in Example 1. IRGANOX 1330 was used being dispersed in 1,3-propanediol, which formed slurry. The ratio of soft segment in the polyether ester block copolymer produced with this amount of each component is 57.9 weight %, as calculated from the weight of each component used as the material. The polyether ester block copolymer obtained was made into a pellet in the same manner and the evaluations of various physical properties mentioned before were determined. The results are presented in Table 1 described later.

Comparative Example 1

Ester exchange reaction and polycondensation reaction were performed in the same manner as described in Example 1, except that the amount of each component used as the material was 52.8 g of dimethyl terephthalate, 26.5 g of 1,4-butanediol and 97.5 g of polyoxytrimethylene glycol (A). The kind and ratio of additives were also the same as in Example 1. The ratio of soft segment in the polyether ester block copolymer produced with this amount of each component is 72.4 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 2

Ester exchange reaction and polycondensation reaction were performed in the same manner as described in Example 1, except that the amount of each component used as the material was 53.8 g of dimethyl terephthalate, 26.1 g of 1,4-butanediol and 97.5 g of polyoxytetramethylene glycol (Mitsubishi Chemical PTMG1000, Mn=1011. In the following description, this polyoxytetramethylene glycol may sometimes be indicated by a mark "B"). The kind and ratio of additives were also the same as in Example 1. The ratio of soft segment in the polyether ester block copolymer produced with this amount of each component is 73.5 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 3

Ester exchange reaction and polycondensation reaction were performed in the same manner as described in Example 1, except that the amount of each component used as the material was 69.5 g of dimethyl terephthalate, 39.5 g of 1,4-butanediol and 78.0 g of polyoxytetramethylene glycol (B). The kind and ratio of additives were also the same as in Example 1. The ratio of soft segment in the polyether ester block copolymer produced with this amount of each component is 58.8 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 4

Ester exchange reaction and polycondensation reaction were performed in the same manner as described in Example 1, except that the amount of each component used as the material was 90.0 g of dimethyl terephthalate, 57.0 g of 1,4-butanediol and 52.5 g of polyoxytetramethylene glycol (B). The kind and ratio of additives were also the same as in Example 1. The ratio of soft segment in the polyether ester block copolymer produced with this amount of each component is 39.5 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 5

Ester exchange reaction and polycondensation reaction were performed in the same manner as described in Example 1, except that the amount of each component used as the material was 108.1 g of dimethyl terephthalate, 72.5 g of 1,4-butanediol and 30.0 g of polyoxytetramethylene glycol (B). The kind and ratio of additives were also the same as in Example 1. The ratio of soft segment in the polyether ester block copolymer produced with this amount of each component is 22.6 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 6

Ester exchange reaction and polycondensation reaction were performed in the same manner as described in Example 1, except that the amount of each component used as the material was 66.5 g of dimethyl terephthalate, 40.7 g of 1,4-butanediol and 78.0 g of polyoxytetramethylene glycol (Mitsubishi Chemical PTMG2000, Mn=1968. In the following description, this polyoxytetramethylene glycol may sometimes be indicated by a mark "D"). The kind and ratio of additives were also the same as in Example 1. The ratio of soft segment in the polyether ester block copolymer produced with this amount of each component is 22.6 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 7

Ester exchange reaction and polycondensation reaction were performed in the same manner as described in Example 1, except that the amount of each component used as the material was 88.0 g of dimethyl terephthalate, 57.8 g of 1,4-butanediol and 52.5 g of polyoxytetramethylene glycol (D). The kind and ratio of additives were also the same as in Example 1. The ratio of soft segment in the polyether ester block copolymer produced with this amount of each component is 37.3 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 8

Ester exchange reaction and polycondensation reaction were performed in the same manner as described in Example 1, except that the amount of each component used as the material was 73.2 g of dimethyl terephthalate, 34.9 g of 1,3-propanediol and 78.0 g of polyoxytetramethylene glycol (B). The kind and ratio of additives were also the same as in Example 1. IRGANOX 1330 was used being dispersed in 1,3-propanediol, which formed slurry. The ratio of soft segment in the polyether ester block copolymer produced with this amount of each component is 58.8 weight %, as calculated from the weight of each component used as the material. The polyether ester block copolymer obtained was made into a pellet in the same manner and the evaluations of various physical properties mentioned before were determined. The results are presented in Table 2 described later.

Comparative Example 9

As PBT resin containing only hard segment and not containing soft segment, Novaduran 5010R5 of Mitsubishi Engineering Plastics was used. Its evaluations of various physical properties mentioned before were determined and the result is presented in Table 2.

[Result of Evaluation]

Table 1 and Table 2 show the result of evaluation of various physical properties of the polyether ester block copolymers obtained in Examples 1 to 6 and Comparative Examples 1 to 9. In Table 1 and Table 2, "DMT" indicates dimethyl terephthalate, "1,4-BG" indicates 1,4-butanediol, and "1,3-PDO" indicates 1,3-propanediol. Polyoxytrimethylene glycol and polyoxytetramethylene glycol, used as long chain diol component, are expressed by the marks A to D, as defined previously (A and C represent polyoxytrimethylene glycol (PO3G) and B and D represent polyoxytetramethylene glycol (PTMG)).

TABLE 1

|  |  | Examples | | | | | |
| --- | --- | --- | --- | --- | --- | --- | --- |
|  |  | 1 | 2 | 3 | 4 | 5 | 6 |
| a': Aromatic dicarboxylic acid component |  | DMT | DMT | DMT | DMT | DMT | DMT |
| b': 1,3-Propanediol and/or 1,4-butanediol component |  | 1,4-BG | 1,4-BG | 1,4-BG | 1,4-BG | 1,4-BG | 1,3-PDO |
| c': Long chain diol component |  | A | A | A | C | C | A |
| Content of soft segment | weight % | 57.9 | 38.9 | 22.2 | 55.5 | 37.3 | 57.9 |
| Inherent viscosity (η inh) | dl/g | 1.55 | 1.33 | 1.21 | 1.50 | 1.42 | 1.29 |
| Terminal carboxyl group (AV) | eq/ton | 34.7 | 27.2 | 28.0 | 40.0 | 35.7 | 4.7 |
| Density | g/cm$^3$ | 1.163 | 1.211 | 1.254 | 1.161 | 1.207 | 1.177 |
| Tensile strength at break | MPa | 26.4 | 31.2 | 47.8 | 25.1 | 30.3 | 20.2 |
| Tensile elongation at break | % | 930 | 675 | 590 | 810 | 600 | 725 |
| Durometer hardness (D type) | — | 42.3 | 57.0 | 64.1 | 44.2 | 54.3 | 46.7 |

TABLE 1-continued

|  |  | Examples | | | | | |
|---|---|---|---|---|---|---|---|
|  |  | 1 | 2 | 3 | 4 | 5 | 6 |
| <Evaluation of sound deadening> | | | | | | | |
| Maximum noise level (L) | dB(A) | 90.3 | 91.7 | 97.2 | 88.8 | 96.1 | 91.6 |
| $\Delta L$ (=$L_0$ − L) | dB | 7.3 | 5.9 | 0.4 | 8.8 | 1.5 | 6.0 |
| Absolute value of slope (D) of-noise level attenuation line | dB/sec | 123.6 | 137.9 | 147.5 | 144.0 | 162.1 | 165.2 |
| $\Delta D$ (=D − $D_o$) | dB/sec | −3.0 | 11.3 | 20.9 | −2.3 | 15.8 | 18.9 |
| <Evaluation of tribological property> | | | | | | | |
| Static frictional coefficient | — | — | 0.36 | 0.25 | 0.16 | 0.29 | 0.21 — |
| Dynamic frictional coefficient | — | — | 0.27 | 0.18 | 0.03 | 0.25 | 0.18 — |

<note 1>
DMT: dimethylterephthalate, 1,4-BG: 1,4-butanediol, 1,3-PDO: 1,3-propanediol
<note 2>
long chain diol component: A and C = polyoxytrimethylene glycol (PO3G)

TABLE 2

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| a': Aromatic dicarboxylic acid component | | DMT | DMT | DMT | DMT | DMT | DMT | DMT | DMT | (*) |
| b': 1,3-Propanediol and/or 1,4-butanediol component | | 1,4-BG | 1,4-BG | 1,4-BG | 1,4-BG | 1,4-BG | 1,4-BG | 1,4-BG | 1,3-PDO | 1,4-BG |
| c': long chain diol component | | A | B | B | B | B | D | D | B | none |
| Content of soft segment | weight % | 72.4 | 73.5 | 58.8 | 39.5 | 22.6 | 55.5 | 37.3 | 58.8 | 0.0 |
| Inherent viscosity ($\eta$ inh) | dl/g | 1.67 | 1.62 | 1.50 | 1.32 | 1.18 | 1.53 | 1.45 | 1.25 | — |
| Terminal carboxyl group (AV) | eq/ton | 34.4 | 27.2 | 27.2 | 37.1 | 22.5 | 36.2 | 31.1 | 7.3 | — |
| Density | g/cm$^3$ | 1.127 | 1.100 | 1.140 | 1.195 | 1.243 | 1.133 | 1.186 | 1.177 | 1.309 |
| Tensile strength at break | MPa | 13.5 | 9.5 | 22.0 | 31.4 | 53.1 | 23.0 | 29.5 | 18.4 | 51.0 |
| Tensile elongation at break | % | 1020 | 910 | 925 | 655 | 650 | 800 | 570 | 680 | 150 |
| Duroreter hardness (D type) | — | 33.6 | 33.5 | 43.3 | 57.2 | 64.5 | 43.6 | 55.2 | 45.3 | 79.2 |
| <Evaluation of sound deadening> | | | | | | | | | | |
| Maximum noise level (L) | dB(A) | 81.8 | 82.6 | 92.9 | 93.1 | 97.2 | 91.4 | 96.2 | 91.6 | 106.1 |
| $\Delta L$ (=$L_0$ − L) | dB | 15.8 | 15.0 | 4.7 | 4.5 | 0.4 | 6.2 | 1.4 | 6.0 | −8.5 |
| Absolute value of slope of-noise level attenuation line | dB/sec | 106.8 | 108.8 | 122.8 | 122.5 | 136.6 | 143.9 | 151.0 | 137.5 | 180.1 |
| $\Delta D$ (=D − $D_0$) | dB/sec | −19.8 | −17.8 | −3.8 | −4.1 | 10.0 | −2.4 | 4.7 | −8.8 | 33.8 |
| <Evaluation of tribological property> | | | | | | | | | | |
| Static frictional coefficient | — | — | 0.57 | 0.57 | 0.39 | 0.38 | 0.19 | 0.43 | 0.30 | — | — |
| Dynamic frictional coefficient | — | — | 0.33 | 0.38 | 0.34 | 0.23 | 0.09 | 0.26 | 0.19 | — | — |

<note 1>
DMT: dimethylterephthalate, 1,4-BG: 1,4-butanediol, 1,3-PDO: 1,3-propanediol (*): terephthalic acid unit
<note 2>
long chain diol component A and C = polyoxytrimethylene glycol (PO3G)
B and D = polyoxytetramethylene glycol (PIMG)

The following is evident from the results shown in Table 1 and Table 2.

From the comparison between Example 1 and Comparative Example 3, Example 2 and Comparative Example 4, and Example 3 and Comparative Example 5, which surface hardness of the heat press sheet used for the determination of various physical properties is nearly equal, the polyether ester block copolymer used in Examples, based on a long chain diol component of polyoxytrimethylene glycol with the number average molecular weight of 1163, is superior in sound deadening quality and tribological property to the polyether ester block copolymer used in Comparative Examples, based on a long chain diol component of polyoxytetramethylene glycol with the number average molecular weight of 1011.

Furthermore, from the comparison between Example 4 and Comparative Example 6, and Example 5 and Comparative Example 7, which surface hardness of the heat press sheet is nearly equal, the polyether ester block copolymer used in Examples, based on a long chain diol component of polyoxytrimethylene glycol with the number average molecular weight of 1962, is superior in sound deadening quality and tribological property to the polyether ester block copolymer used in Comparative Examples, based on a long chain diol component of polyoxytetramethylene glycol with the number average molecular weight of 1968.

Furthermore, from the comparison between Example 6 and Comparative example 8, whose hard segments consist of polytrimethylene terephthalate, not polybutyleneterephthalate, the polyether ester block copolymer using polyoxytrimethylene glycol as a long chain diol component described in Example is superior in sound deadening quality to the polyether ester block copolymer using polyoxytetramethylene glycol as a long chain diol component described in Comparative Example.

On the other hand, in Comparative Example 1 and Comparative Example 2, surface hardness of the heat press sheet of the copolymer is insufficient and therefore their application to a structural member is difficult. In sound deadening quality, superiority in using polyoxytrimethylene glycol, in comparison with when polyoxytetramethylene glycol is used, is very small.

In Comparative Example 9 in which PBT resin containing only hard segment and not containing soft segment was used, surface hardness of the copolymer is excessive and elasticity is inadequate.

The present invention has been explained in detail above by referring to specific embodiments. However, it is obvious for those skilled in the art that various modifications can be added thereto without departing from the intention and the scope of the present invention.

The present application is based on the description of Japanese Patent Application No. 2005-117730, filed on Apr. 15, 2005, and Japanese Patent Application No. 2006-111856, filed on Apr. 14, 2006, and their entireties are incorporated herewith by reference.

INDUSTRIAL APPLICABILITY

The polyether ester block copolymer of the present invention can be used as materials for various sound deadening structural members. Concretely, it can be preferably used for, for example, auto parts, industrial parts, precision machine parts, electric/electronic device parts, articles of daily use, fiber products and film products. It is particularly suitable for auto parts, for which good tribological property as well as sound deadening quality is required, and electric/electronic device parts, for which noise control is essential.

The invention claimed is:

1. A sound deadening structural member comprising a polyether ester block copolymer comprising:

a hard segment of formula (1):

(1)

and a soft segment of formula (2):

(2)

wherein $R^1$ is an aromatic dicarboxylic acid unit, $R^2$ is (b) a 1,3-propylene and/or a 1,4-butylene unit, and $\{-(CH_2)_3-O-\}$ is a long chain diol unit consisting of polyoxytrimethylene glycol having a number average molecular weight of from 600 to 3000, wherein a weight % of the soft segment of formula (2) is from 20 to 58% of the total weight of the polyether ester block copolymer, and a durometer hardness (type D) of the polyether ester block copolymer, measured according to JIS K6253, is from 40 to 78.

2. An auto part comprising said sound deadening structural member as defined in claim 1.

3. An electric/electronic device part comprising said sound deadening structural member as defined in claim 1.

4. The sound deadening structural member of claim 1, further comprising at least one additive selected from the group consisting of a filler, a reinforcing agent, a mold release agent, a lubricant, a dye, a pigment, a photostabilizer, a foaming agent, a bridging agent, a viscosity adjusting agent, a tribological property improvement agent and an electrical conducting material.

* * * * *